United States Patent [19]

Weder

[11] Patent Number: 5,488,813
[45] Date of Patent: Feb. 6, 1996

[54] METHOD FOR WRAPPING A VASE CONTAINING A FLORAL GROUPING

[75] Inventor: Donald E. Weder, Highland, Ill.

[73] Assignee: Highland Supply Corporation, Highland, Ill.

[21] Appl. No.: 242,497

[22] Filed: May 13, 1994

Related U.S. Application Data

[63] Continuation-in-part of Ser. No. 188,183, Jan. 28, 1994, Pat. No. 5,388,386, which is a continuation of Ser. No. 968,798, Oct. 30, 1992, Pat. No. 5,369,934, which is a continuation of Ser. No. 865,563, Apr. 9, 1992, Pat. No. 5,245,814, which is a continuation of Ser. No. 649,379, Jan. 31, 1991, Pat. No. 5,111,638, which is a continuation of Ser. No. 249,761, Sep. 26, 1988, abandoned, which is a continuation-in-part of Ser. No. 219,083, Jul. 13, 1988, Pat. No. 4,897,031.

[51] Int. Cl.$^6$ .................. B65B 11/56; B65B 25/02; B65B 61/14; B65B 67/08
[52] U.S. Cl. .................. 53/397; 53/216; 53/219; 53/390; 53/413; 53/465; 53/592
[58] Field of Search .................. 53/399, 397, 413, 53/410, 134.1, 465, 461, 592, 594, 214, 210, 216, 219, 218, 390; 206/423

[56] References Cited

U.S. PATENT DOCUMENTS

| | | |
|---|---|---|
| Re. 21,065 | 5/1939 | Copeman . |
| 732,889 | 7/1903 | Paver . |
| 1,446,563 | 2/1923 | Hughes . |
| 1,525,015 | 2/1925 | Weeks ............................. 53/461 X |
| 1,863,216 | 6/1932 | Wordingham . |
| 1,978,631 | 10/1934 | Herrlinger ........................... 91/68 |
| 2,048,042 | 7/1936 | Wedge ............................ 53/465 X |
| 2,048,123 | 7/1936 | Howard ...................... 229/87.01 X |
| 2,170,147 | 8/1939 | Lane ................................... 206/56 |
| 2,248,687 | 7/1941 | Nakahiro ........................ 53/219 X |
| 2,278,673 | 4/1942 | Savada et al. ...................... 154/43 |
| 2,302,259 | 11/1942 | Rothfuss ......................... 150/52 R |
| 2,355,559 | 8/1944 | Renner .................................. 229/8 |
| 2,371,985 | 3/1945 | Freiberg ............................ 206/46 |
| 2,411,328 | 11/1946 | MacNab ............................. 32/12 |
| 2,510,120 | 6/1950 | Leander ............................ 117/122 |
| 2,529,060 | 11/1950 | Trillich ............................ 117/68.5 |
| 2,540,090 | 2/1951 | Brackney ....................... 53/219 X |
| 2,621,142 | 12/1952 | Wetherell .......................... 154/117 |
| 2,774,187 | 12/1956 | Smithers ......................... 206/423 X |
| 2,822,287 | 2/1958 | Avery ................................. 117/14 |
| 2,846,060 | 8/1958 | Yount .................................. 206/58 |
| 2,850,842 | 9/1958 | Eubank, Jr. ........................... 47/58 |
| 2,883,262 | 4/1959 | Borin .................................. 21/56 |
| 2,989,828 | 6/1961 | Warp ................................. 53/390 |
| 3,022,605 | 2/1962 | Reynolds ............................. 47/58 |
| 3,121,647 | 2/1964 | Harris et al. ...................... 118/202 |
| 3,130,113 | 4/1964 | Silman .............................. 161/97 |
| 3,271,922 | 9/1966 | Wallerstein et al. .................... 53/3 |
| 3,431,706 | 3/1969 | Stuck ................................ 53/390 |
| 3,508,372 | 4/1970 | Wallerstein et al. .............. 53/594 X |
| 3,620,366 | 11/1971 | Parkinson ........................... 206/59 |
| 3,681,105 | 8/1972 | Milutin et al. ..................... 117/15 |
| 3,793,799 | 2/1974 | Howe et al. ......................... 53/32 |
| 4,054,697 | 10/1977 | Reed et al. ......................... 428/40 |
| 4,118,890 | 10/1978 | Shore ................................. 47/28 |
| 4,216,620 | 8/1980 | Weder et al. ........................ 47/72 |
| 4,280,314 | 7/1981 | Stuck ............................... 53/241 |
| 4,297,811 | 11/1981 | Weder ............................... 47/72 |
| 4,300,312 | 11/1981 | Weder ............................... 47/72 |
| 4,333,267 | 6/1982 | Witte ................................. 47/84 |

(List continued on next page.)

FOREIGN PATENT DOCUMENTS

| | | |
|---|---|---|
| 2610604 | 8/1988 | France . |
| 345464 | 2/1917 | Germany . |

*Primary Examiner*—James F. Coan
*Attorney, Agent, or Firm*—Dunlap Codding

[57] ABSTRACT

A method for providing a protective wrapper about a vase containing a floral grouping. A connecting bonding material and a closure bonding material are disposed on the sheet. The sheet is wrapped about the vase causing the connecting bonding material to connect the sheet to the vase. The closure bonding material is sealed above the floral grouping to enclose the floral grouping within the sheet of material. The sheet may have a second closure bonding material for effecting a vertically sealed area in the sheet.

14 Claims, 4 Drawing Sheets

U.S. PATENT DOCUMENTS

| | | | |
|---|---|---|---|
| 4,380,564 | 4/1983 | Cancio et al. | 428/167 |
| 4,413,725 | 11/1983 | Bruno et al. | 206/45.33 |
| 4,546,875 | 10/1985 | Zweber | 206/0.82 |
| 4,640,079 | 2/1987 | Stuck | 53/390 |
| 4,741,440 | 5/1988 | Harris | 206/423 |
| 4,765,464 | 8/1988 | Ristvedt | 206/0.82 |
| 5,239,775 | 8/1993 | Landau | 206/423 X |

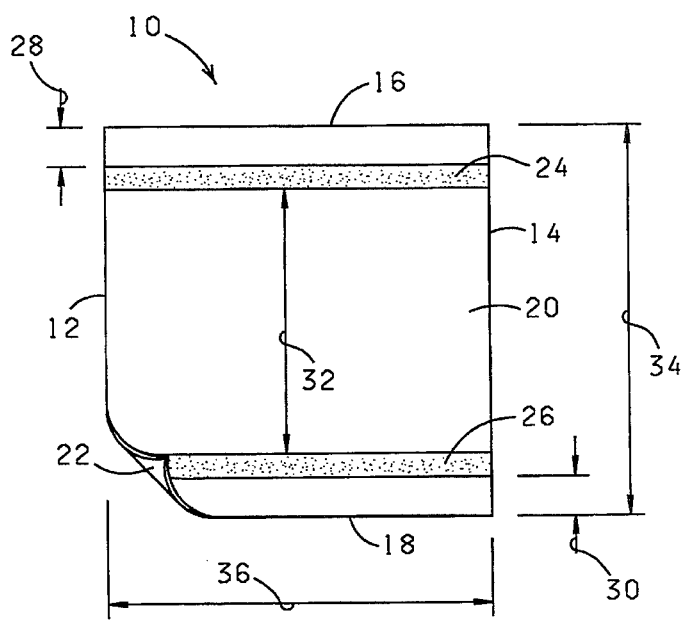
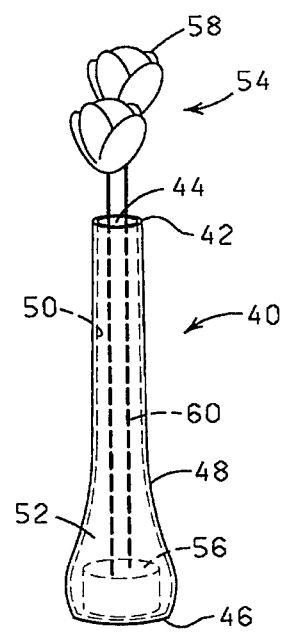
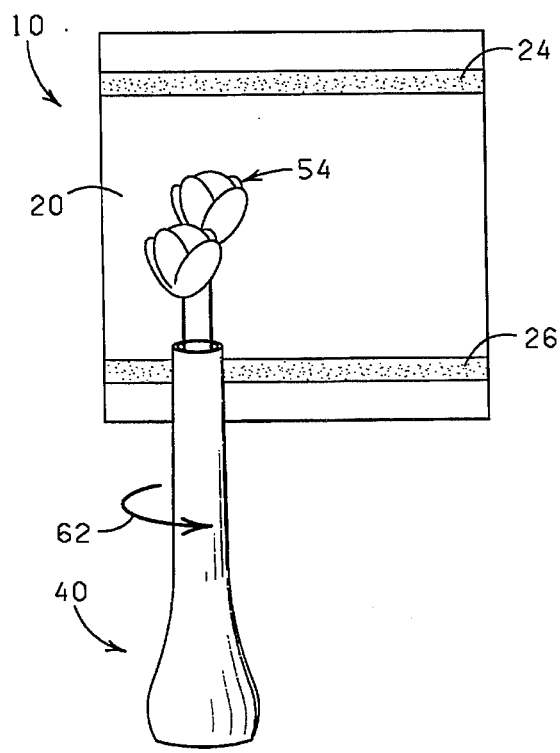
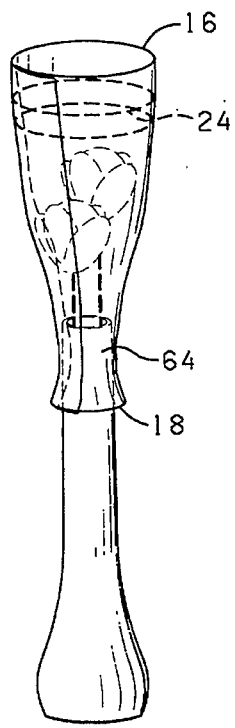

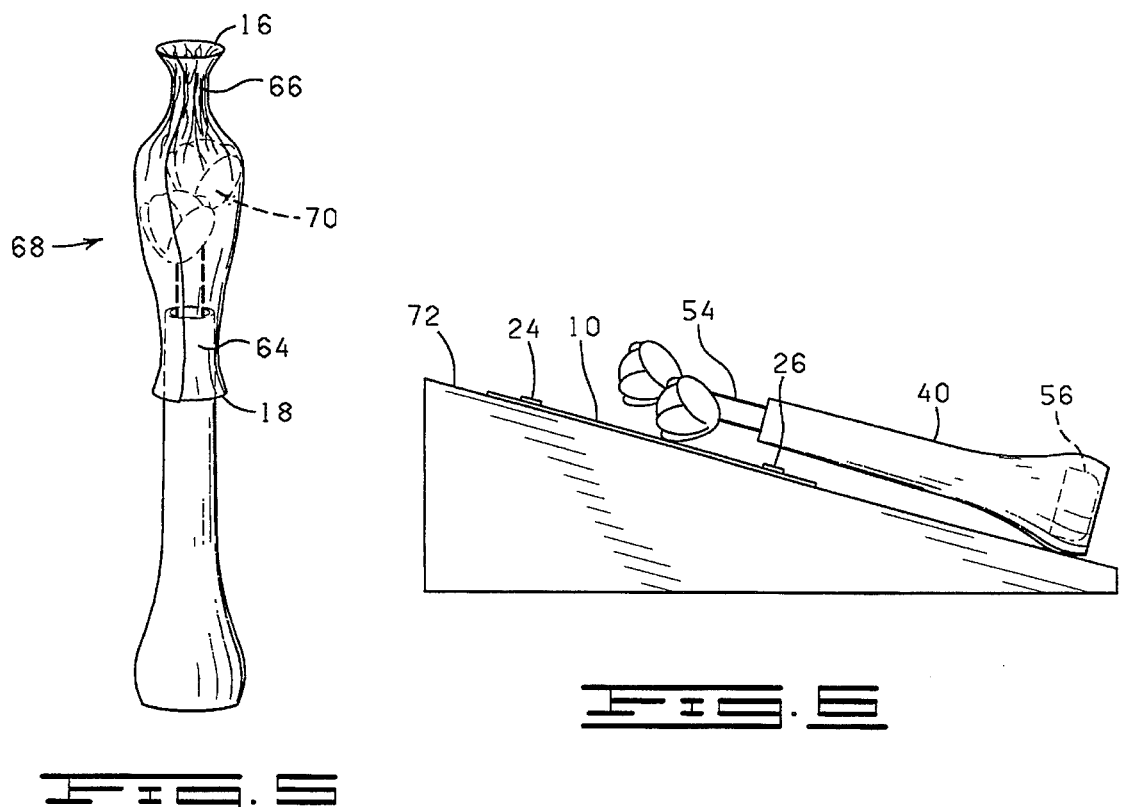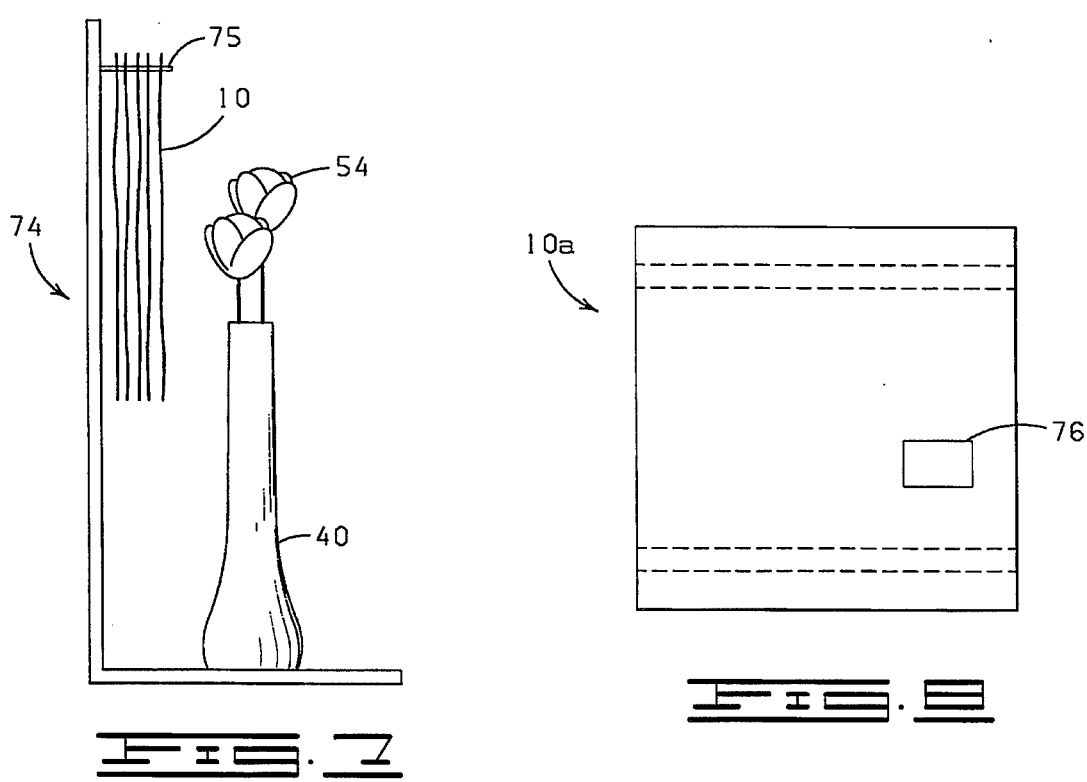

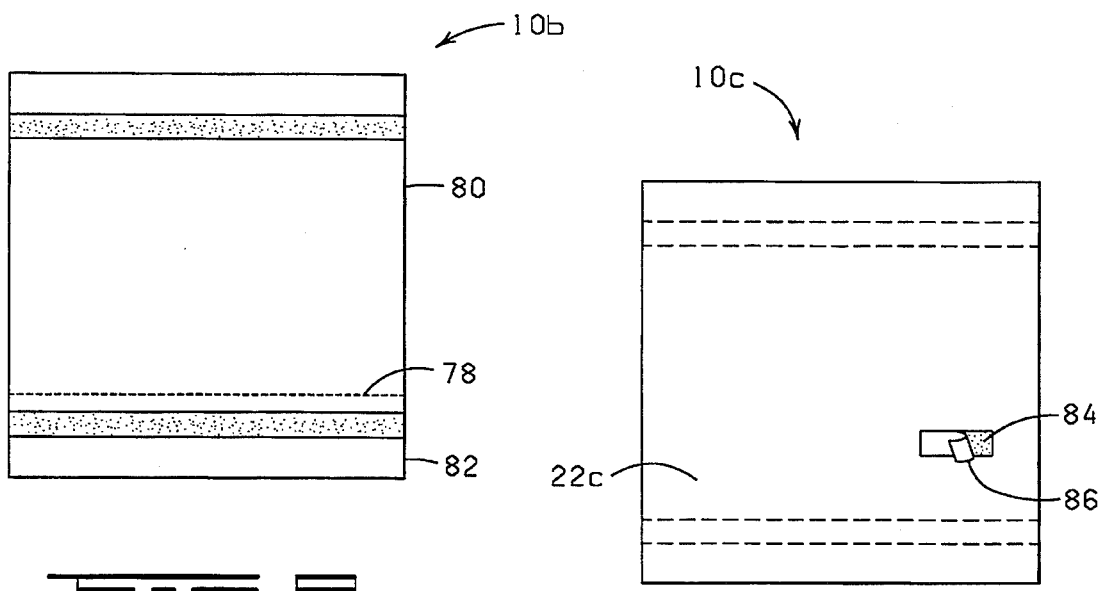
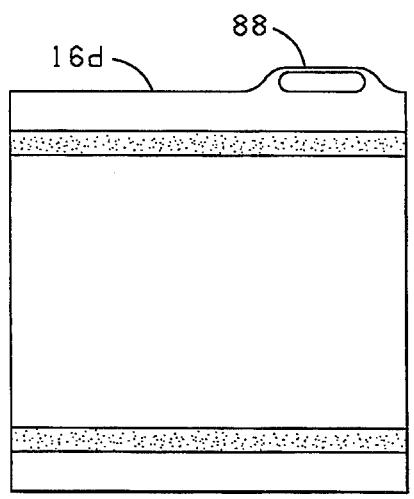
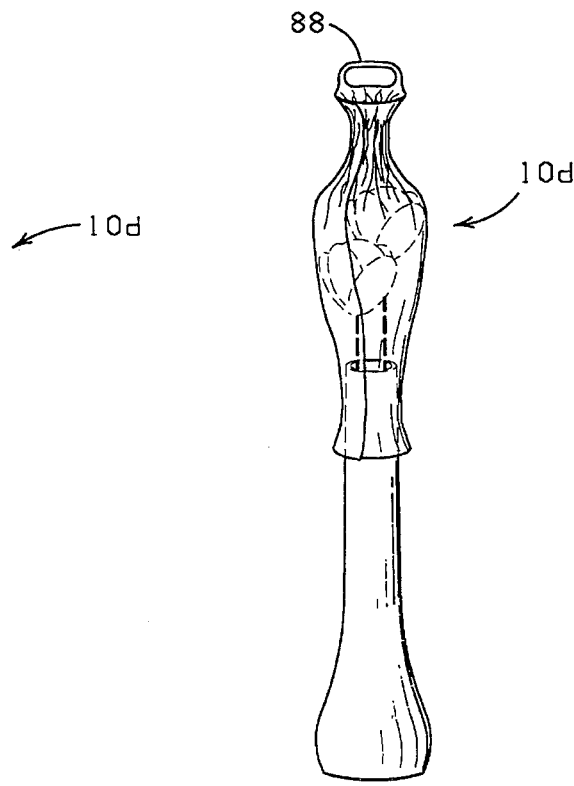

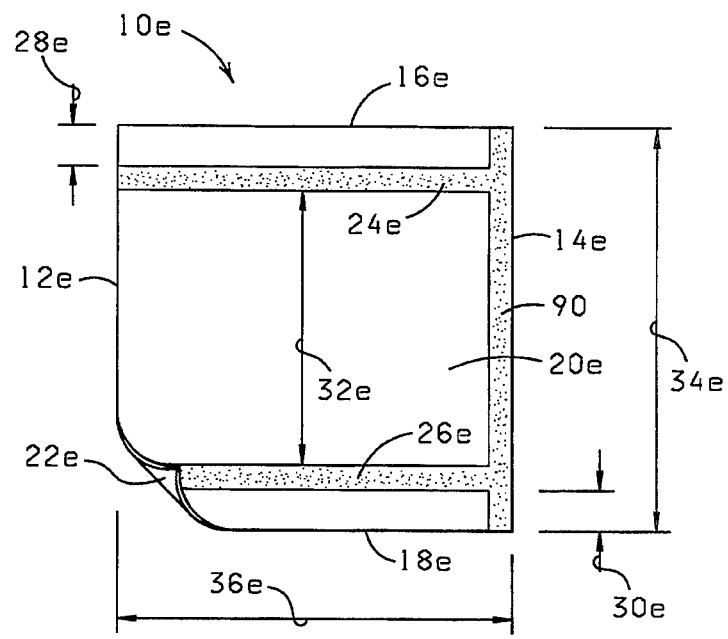
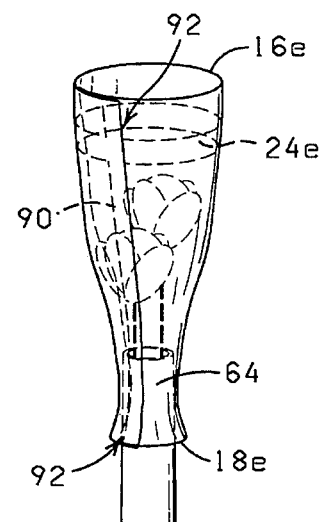
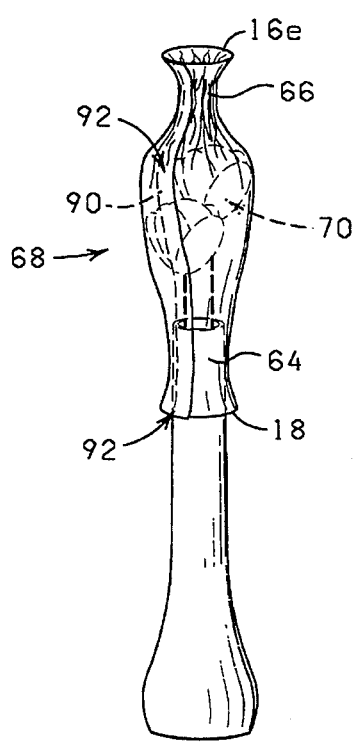

5,488,813

METHOD FOR WRAPPING A VASE CONTAINING A FLORAL GROUPING

CROSS RELATED REFERENCES

This application is a continuation-in-part of U.S. Ser. No. 08/188,183, titled METHOD FOR WRAPPING AN OBJECT WITH A MATERIAL HAVING PRESSURE SENSITIVE ADHESIVE THEREON, filed Jan. 28, 1994, now U.S. Pat. No. 5,388,386; which is a continuation of U.S. Ser. No. 968,798, titled METHOD FOR WRAPPING AN OBJECT WITH A MATERIAL HAVING PRESSURE SENSITIVE ADHESIVE THEREON, filed Oct. 30, 1992, now U.S. Pat. No. 5,369,934; which is a continuation of U.S. Ser. No. 865,563, titled METHOD AND APPARATUS FOR COVERING PORTIONS OF AN OBJECT WITH A SHEET OF MATERIAL HAVING PRESSURE SENSITIVE ADHESIVE COATING APPLIED TO AT LEAST A PORTION OF AT LEAST ONE SURFACE OF THE SHEET OF MATERIAL, filed Apr. 9, 1992, now U.S. Pat. No. 5,245,814; which is a continuation of U.S. Ser. No. 649,379, titled METHOD FOR WRAPPING AN OBJECT WITH A MATERIAL HAVING PRESSURE SENSITIVE ADHESIVE THEREON, filed Jan. 31, 1991, now U.S. Pat. No. 5,111,638; which is a continuation of U.S. Ser. No. 249,761, titled METHOD FOR WRAPPING AN OBJECT WITH A MATERIAL HAVING PRESSURE SENSITIVE ADHESIVE THEREON, filed Sep. 26, 1988, now abandoned; which is a continuation-in-part of U.S. Ser. No. 219,083, filed Jul. 13, 1988, now U.S. Pat. No. 4,897,031.

BACKGROUND

The present invention generally relates to methods for wrapping a container and more specifically to a method for wrapping a container such as a vase which contains a floral grouping.

BRIEF DESCRIPTION OF THE DRAWINGS

FIG. 1 is a plan view of a sheet of material having bonding material disposed thereon.

FIG. 2 is a perspective view of a vase having a floral grouping disposed therein.

FIG. 3 is a perspective view of the vase of FIG. 2 disposed adjacent the sheet of FIG. 1.

FIG. 4 is a perspective view of the sheet of material after it has been partially wrapped and connected about the vase.

FIG. 5 is a perspective view of the vase and wrapper of FIG. 4 after the wrapper has been closed about the upper end of the wrapper.

FIG. 6 is a perspective view of a method of wrapping the sheet about the vase on an inclined surface.

FIG. 7 is a perspective view of a method of wrapping a sheet of material about an upright vase.

FIG. 8 is an alternate version of the sheet of material, the sheet having a label disposed thereon.

FIG. 9 is an alternate version of the sheet of material, the sheet having a detaching means therein.

FIG. 10 is an alternate version of the sheet of material having an adhesive portion thereon to which a label can be attached.

FIG. 11 is an alternate version of the sheet of material wherein the sheet has an extension for using as a handle.

FIG. 12 is a perspective view of a vase wrapped with the sheet of material of FIG. 11.

FIG. 13 is a plan view of another sheet of material for use in accordance with the present invention.

FIG. 14 is a perspective view of a vase partially wrapped by the sheet of FIG. 13.

FIG. 15 is a perspective view of the wrapped vase of FIG. 14 with the upper end of the wrapper closed.

DESCRIPTION OF THE INVENTION

The present invention comprises a method of wrapping a vase which contains a floral grouping for the purpose of protecting the floral grouping during transport or storage, and particularly for protecting the bloom portion of the floral grouping or for decorating the floral grouping. The first step of the method comprises providing a vase having an upper end, a lower end, an outer surface, and an inner surface which defines and encompasses an inner space. The inner space accessible via an opening in the upper end. At least a portion of a floral grouping having an upper end is disposed within the inner space of the vase, the upper end of the floral grouping extending a distance from the upper end of the vase. Either following or preceding the aforementioned step, a sheet of material having a first side, a second side, an upper end, a lower end, an inner surface and an outer surface is provided. The sheet of material further comprises a connecting bonding material disposed upon a portion of the inner surface for connecting to the outer surface of the vase. In a preferred embodiment, the sheet further comprises a closure bonding material also disposed upon a portion of the inner surface near the upper end of the sheet of material for effecting a sealed area.

The sheet of material may further comprise a second closure bonding material for effecting a lengthwise seal along the sheet of material, after the sheet has been wrapped about the vase as described below.

In a wrapping step, the vase with the floral grouping contained therein is disposed adjacent the upper surface of the sheet of material wherein a portion of the connecting bonding material is positioned in close proximity to a portion of the outer surface of the vase and wherein the closure bonding material is positioned a distance above the upper end portion of the floral grouping. The sheet of material is then wrapped about an upper portion of the vase wherein the connecting bonding material causes the sheet of material to be connected to a portion of the upper portion of the vase and wherein the upper end of the floral grouping is completely encompassed and surrounded by the sheet of material such that the upper end of the sheet of material extends a distance above the upper end of the floral grouping. Finally, when the sheet has a closure bonding material, the upper end of the sheet of material is sealed by crimping together portions of the sheet of material having the closure bonding material disposed thereon forming a seal and a floral containing space below the seal and within which is contained the portion of the floral grouping extending from the upper end of the vase. In an alternate version of the invention, the floral grouping may be disposed with the vase after the sheet of material has been connected to the outer surface of the vase, but before the closure bonding material, if present, is sealed.

The present invention, in another embodiment, comprises a plant package, comprising (1) a vase having an upper end, a lower end, an outer surface, and an inner surface which defines and encompasses an inner space, the inner space accessible via an opening in the upper end, (2) a floral grouping having an upper end and a lower end, the lower end disposed within the inner space of the vase, the upper end of the floral grouping extending a distance from the upper end of the vase, and (3) a wrapper comprising a sheet of material having a first side, a second side, an upper end, a lower end, an inner surface and an outer surface, the sheet of material further comprising a connecting bonding material disposed upon a portion of the inner surface for connecting to the outer surface of the vase and a closure bonding material also disposed upon a portion of the inner surface of the sheet of material for effecting a sealed area, wherein the sheet of material is wrapped about an upper portion of the vase such that the sheet of material is connected by the connecting bonding material to a portion of the upper portion of the vase and wherein the upper end of the floral grouping is completely encompassed and surrounded by the sheet of material such that the upper end of the sheet of material extends a distance above the upper end of the floral grouping and wherein a portion of the sheet of material near the upper end of the sheet of material is sealed together by the closure bonding material disposed thereon forming a floral containing space within which is contained the portion of the floral grouping extending from the upper end of the vase.

The present invention will now be more particularly described. Referring now to FIG. 1, a sheet of material is designated by the general reference numeral 10. The sheet of material has a first side 12, a second side 14, an upper end 16, a lower end 18, an inner surface 20 and an outer surface 22. Disposed upon at least a portion of the inner surface 20 is a closure bonding material 24 and a connecting bonding material 26. The closure bonding material 24 extends from the first side 12 to the second side 14, and is spaced a distance 28 from the upper end 16. The connecting bonding material 26 extends from the first side 12 to the second side 14 and is spaced a distance 30 from the lower end 18 of the sheet 10. The closure bonding material 24 may be separated from the connecting bonding material 26 by a distance 32 or the closure bonding material 24 and connecting bonding material 26 may be continuous. Each of the distances 28 and 30 may be zero, that is, the connecting bonding material may be disposed along the lower end 18 and the closure bonding material may be disposed along the upper end 16.

The sheet of material 10 has a height 34 extending between the upper end 16 and the lower end 18 of the sheet of material 10. The sheet of material also has a length 36 extending between the first side 12 and the second side 14 of the sheet of material 10.

Alternatively, the closure bonding material 24 and the connecting bonding material 26 may be disposed upon the entire inner surface 20 or substantially the entire inner surface 20 of the sheet of material 10. Further, although the closure bonding material 24 and the connecting bonding material 26 are shown in FIG. 1 as comprising continuous strips, either bonding material may instead be disposed upon the sheet of material 10 in any other geometric form or pattern including blocks, spots, or designs. The sheet of material 10 may have a thickness in a range of from about 0.1 mils to about 30 mils. Preferably, the sheet of material 10 has a thickness in a range from about 0.2 mils to about 10 mils. More preferably, the sheet of material 10 has a thickness of from about 0.5 mils to about 5 mils.

The sheet of material 10 may be any shape and a square or rectangular shape is shown in FIG. 1 only by way of example. The sheet of material 10, may, for example, be square, rectangular, circular or any other geometric shape such as heart-shaped, or any other shape which enhances the function of the sheet for the purpose disclosed herein.

The sheet may be provided as a single sheet, as a pad of sheets, or as a plurality of sheets supported by a hanging structure, the sheets having holes or other means for being supported on the hanger.

The sheet of material 10 may be constructed of a single layer of material or a plurality of layers of the same or different types of materials. Any thickness of the sheet of material 10 may be utilized in accordance with the present invention as long as the sheet of material 10 is wrappable about a vase, in particular a bud vase, as described herein. The layers of material comprising the sheet of material 10 may be connected together or laminated or may be separate layers.

The sheet of material 10 may be used in conjunction with a second sheet of material (not shown) which may be sized the same or smaller than the sheet 10. If used, the second sheet of material has a thickness in a range from 0.1 mils to about 30 mils and preferably in a range from about 0.2 mils to about 10 mils. The second sheet of material is flexible, but may be somewhat more rigid compared to the first sheet of material 10.

As noted earlier, preferably, a closure bonding material 24 and a connecting bonding material 26 are positioned on the inner surface 20 of the sheet of material 10. The closure bonding material 24 (when present) and/or connecting bonding material 26 may be applied as a strip or as spots or other shapes. One method for disposing a bonding material, in this case an adhesive or cohesive, is described in U.S. Pat. No. 5,111,637, entitled "Method For Wrapping A Floral Grouping", issued to Weder et al., on May 12, 1992 and which is hereby incorporated herein by reference.

The term "bonding material or bonding means" when used herein means an adhesive, frequently a pressure sensitive adhesive, or a cohesive. When the bonding material is a cohesive, a similar cohesive material must be present on the surface to be bondingly contacted and bondingly connected with the cohesive material. The term "bonding material or bonding means" also includes materials which are heat sealable and, in this instance, the adjacent portions of the material must be brought into contact and then heat must be applied to effect the seal. The term "bonding material or bonding means" also includes materials which are sonic sealable and vibratory sealable. The term "bonding material or bonding means" when used herein also means a heat sealing lacquer or hot melt material which may be applied to the material and, in this instance, heat sound waves, pressure, or vibrations, also must be applied to effect the sealing.

Alternatively, a cold seal adhesive may be utilized as the bonding material or means. The cold seal adhesive adheres only to a similar substrate, acting similarly as a cohesive, and binds only to itself. The cold seal adhesive, since it bonds only to a similar substrate, does not cause a residue to build up on equipment, thereby both permitting much more rapid disposition and use of such equipment to form articles and reducing labor costs. Further, since no heat is required to effect the seal, the dwell time, that is, the time for the sheet of material to form and retain the shape of an article during formation of the article, such as a flower pot cover or flower pot, is reduced. A cold seal adhesive binds quickly and easily with minimal pressure, and such a seal is not readily releasable. This characteristic is different from, for example, a pressure sensitive adhesive.

The first sheet of material 10 can be utilized alone or in combination with the second of material (not shown) to wrap a vase such as a bud vase as described in more detail below.

By "vase" is meant a vessel, substantially higher than it is wide, which is used to hold a floral grouping or other decoration. More particularly, the height of the vase is generally at least three to five times greater than the narrowest diameter. The vase may be constructed from glass, plastic, metal, clay or other earthenware, porcelain or any other material which functions to hold a floral grouping in accordance with the present invention. When used herein the term "bud vase" refers to a vase for holding just one to several cut flowers or buds.

The term "vase" refers to any type of container used for holding a floral grouping or single floral cuttings. "Floral grouping" as used herein means cut fresh flowers, artificial flowers, a single flower either fresh and/or artificial plants or other floral materials and may include other secondary plants and/or ornamentation or artificial or natural materials which add to the aesthetics of the overall floral arrangement. The floral grouping generally comprises a bloom or foliage portion and a stem portion. However, it will be appreciated that the floral grouping may consist of only a singe bloom or only foliage (not shown). The term "floral grouping" may be used interchangeably herein with the term "floral arrangement".

The sheet of material 10 and the second sheet of material (if used) may be constructed of a single layer of material or a plurality of layers of the same or different types of materials. Any thickness of the sheet of material 10 may be utilized in accordance with the present invention as long as the sheet of material 10 may be wrapped or formed about at least a portion of a portion of a vase and floral grouping contained therein, in the manner described herein. Additionally, an insulating material such as bubble film, preferable as one of two or more layers, can be utilized in order to provide additional protection for the item wrapped therein.

In a preferred embodiment, the sheet of material 10 is constructed from two polypropylene films laminated together (e.g. a polypropylene film such as Mobil 220 AB clear film laminated to a sheet of Mobil 270 ABW white opaque film). The sheet of material 10 is constructed from any suitable wrapping material that is capable of being wrapped about a vase containing a floral grouping. Preferably, the wrapping material 10 comprises a paper (untreated or treated in any manner), cellophane, foil, polymer film, fabric (woven or nonwoven or synthetic or natural), burlap, or combinations thereof. The term "polymer film" means a man-made polymer such as a polypropylene or a naturally occurring polymer such as cellophane. A polymer film is relatively strong and not as subject to tearing (substantially non-tearable), as might be the case with paper or foil.

The sheet of material 10 may vary in color. Further, the sheet of material 10 may consist of designs or decorative patterns which are printed, etched, and/or embossed thereon using inks or other printing materials. An example of an ink which may be applied to the surface of the sheet of material 10 is described in U.S. Pat. No. 5,147,706, entitled "Water Based Ink On Foil And/Or Synthetic Organic Polymer", issued to Kingman on Sep. 15, 1992 and which is hereby incorporated herein by reference. In addition, the sheet of material 10 may have various colorings, coatings, flocking and/or metallic finishes, or other decorative surface ornamentation applied separately or simultaneously or may be characterized totally or partially by pearlescent, translucent, transparent, iridescent or the like, qualities. Each of the above-named characteristics may occur alone or in combination and may be applied to the upper and/or lower surface of the sheet of material 10 or to near the upper end 16 or to near the lower end 18 of the sheet 10. Moreover, each surface of the sheet of material 10 may vary in the combination of such characteristics. The sheet of material 10 itself may be opaque, translucent or partially clear or tinted transparent.

The sheet of material 10 may also be constructed, in whole or in part, from a cling material. "Cling Wrap or Material" when used herein means any material which is capable of connecting to itself upon contacting engagement during the wrapping process and is wrappable about an item whereby portions of the cling material contactingly engage and connect to other portions of another material, or, alternatively, itself, for generally partially securing the material wrapped about at least a portion of a vase. This connecting engagement is preferably temporary in that the material may be easily removed, i.e., the cling material "clings" to the vase.

The cling material is constructed and treated if necessary, from polyethylene such as Cling Wrap made by Glad®, First Brands Corporation, Danbury, Conn. The thickness of the cling material will, in part, depend upon the size of sheet 10 and the size of the vase. A larger vase may require a thicker and therefore stronger cling material. The cling material will range in thickness from less than about 0.1 mils to about 10 mils, and preferably less than about 0.5 mils to about 2.5 mils and most preferably from less than about 0.6 mils to about 2 mils. However, any thickness of cling material may be utilized in accordance with the present invention which permits the cling material to function as described herein.

Shown in FIG. 2 and designated by the general reference numeral 40 is a vase used in accordance with the present invention. The vase 40 has an upper end 42 which has an opening 44, a lower end 46, an outer surface 48, an inner surface 50 and an inner space 52 which is defined and encompassed by the inner surface 50 and which is accessible through the opening 44. The vase 40 may have a floral grouping 54 which has at least a portion thereof disposed within the inner space 52. The vase 40 may further have a floral holding medium (such as foam) 56 disposed within the inner space 52 for holding a portion of the floral grouping 54, for providing moisture or nutrients, or for providing additional weight to the vase 40 to counterbalance the floral grouping 54. The floral holding medium 56 may further comprise a growing medium for extending the life of the floral grouping 54 disposed within the inner space 52 of the vase 40. Such floral holding materials 56 are well known to those of ordinary skill in the art and may be purchased commercially.

As noted above, the floral grouping 54 generally comprises a bloom 58 portion and a stem portion 60. Further, the floral grouping 54 may comprise a root portion (not shown) as well. However, it will be appreciated that the floral grouping may consist of only a single bloom or only foliage, or a botanical item (not shown), or a propagule (not shown). The term "floral grouping" may also be used interchangeably herein with the terms "botanical item" and/or "propagule".

The term "growing medium" when used herein means any liquid, solid or gaseous material used for plant growth or for the cultivation of propagules, including organic and inorganic materials such as soil, humus, perlite, vermiculite, sand, water and including the nutrients, fertilizers or hormones or combinations thereof required by the plants or propagules for growth.

The term "botanical item" when used herein means a natural or artificial herbaceous or woody plant, taken singly or in combination. The term "botanical item" also means any portion or portions of natural or artificial herbaceous or woody plants including stems, leaves, flowers, blossoms, buds, blooms, cones, or roots, taken singly or in combination, or in groupings of such portions such as bouquet or floral grouping.

The term "propagule" when used herein means any structure capable of being propagated or acting as an agent of reproduction including seeds, shoots, stems, runners, tubers, plants, leaves, roots or spores.

A method of use of the present invention is represented in FIGS. 3 and 4. FIG. 3 shows a vase 40 having a floral grouping 54 disposed with the inner space 52 thereof. The upper end 42 of the vase 40 and the floral grouping 54 are disposed adjacent a portion of the inner surface 20 of the sheet of material 10. The vase 40 is then rotated in a direction 62 as a portion of the outer surface 48 of the vase 40 is manually or automatically engagingly pressed against the connecting bonding material 26 of the sheet of material 10. The vase 40 is rollingly urged thereby engaging the connecting bonding material 26 of the sheet of material 10, a connected area 64 is formed (FIG. 4) in the sheet of material 10 where the sheet of material 10 is bondingly connected to the outer surface 48 of the vase 40. In the next step, the closure bonding material 24 is crimped together to close the upper end 16 of the sheet 10, forming a crimped area 66 as shown in FIG. 5, wherein is formed a plant package 68 comprising the wrapped and connected sheet 10, the vase 40 and the floral grouping 54. When the lower end 18 of the sheet of material 10 is bondingly connected to the vase 40 and the upper end 16 of the sheet of material 10 is crimpingly closed, a floral containing space 70 which surrounds the upper portion of the floral grouping 54 is formed. In an alternate version of the invention, the closure bonding material 24, may be left uncrimped leaving the upper end 16 of the sheet of material 10 unsealed.

When the connecting bonding material 26 is a cohesive, an additional cohesive bonding material may be disposed upon a portion of the outer surface 48 of the vase 40 near the upper end 42 of the vase 40 for connecting to the connecting bonding material 26 on the sheet 10. The vase 40 may further comprise a bonding material (not shown) disposed on the bottom of the lower end 46 thereof for enabling the vase 40 to be connected to a surface to stabilize the vase 40 in a vertical position once it has been wrapped.

As noted above, the inner space 52 of the vase 40 or the floral holding material 56 may contain a liquid or granular material which, if the vase 40 is tipped flat, may leak from the vase 40. Therefore, it may be desirable in certain situations to wrap the sheet 10 about the vase 40 on an inclined surface such as the inclined surface shown in FIG. 6 and designated by the reference numeral 72. It will also be understood by one of ordinary skill in the art that the sheet of material 10 could be wrapped about the vase 40 while the vase 40 is maintained in an upright or nearly upright configuration by holding the vase 40 manually or automatically in a stationary position and wrapping the sheet of material 10 thereabout. One can also envision a process in which a sheet of material 10 is held disposed in an upright position and a vase 40, also positioned uprightly, is rotated from the first side 12 of the sheet of material 10 to the second side 14 of the sheet of material 10 causing the connecting bonding material 26 on the sheet of-material 10 to be connected to a portion of the outer surface 48 of the vase 40 as described above. An apparatus for enabling such a process is shown in FIG. 7, designated therein by reference numeral 74. The apparatus 74 supports a plurality of sheets of material 10, each of which can be detached separately from a hanger 75.

It will be apparent to one of ordinary skill in the art that numerous variations in the construction of the sheet of material 10 may be made to enhance the function of the plant package 68. For example, ventilation holes (not shown) may be disposed in portions of the sheet of material 10 for allowing gas exchange between the outer atmosphere and the floral containing space 70 of the plant package 68. A label 76 or other information delivery mechanism may be affixed or affixable to the lower surface 22 of the sheet of material 10 for providing information useful to the packager, distributor, seller or buyer of the plant package 68. Shown in FIG. 8 is such a sheet of material 10a which is exactly the same as sheet of material 10 but which also has a label designated by the reference numeral 76.

In another embodiment, shown in FIG. 9, is a sheet of material of material 10b, which is exactly the same as sheet of material 10 but further comprises a detaching element 78 for allowing an upper portion 80 of the sheet of material 10b to be detached from a lower portion 82 of the sheet of material 10b after the sheet of material 10b has been connectingly disposed about the upper end 42 of the vase 40. The detaching element 78 may be a line of perforations, a tear strip or any other means for effecting the separation of the upper portion 80 from the lower portion 82 of the sheet of material 10. After the detaching step, the lower portion 82 may remain to provide a protective function and/or a decorative function.

In another embodiment, shown in FIG. 10, is a sheet of material designated by the reference numeral 10c. The sheet of material 10c is exactly the same as sheet of material 10 except the sheet of material 10c further comprises an area of a bonding material 84 on the outer surface 22c of the sheet of material 10c. The bonding material 84 may be concealed by a release strip 86, shown in FIG. 10 as partially peeled away from the bonding material 84. The bonding material 84 may be used, after the sheet of material 10c has been disposed about a vase 40 as described above, to attach a label or other information delivery means (not shown) for identifying the plant package or for providing instructions, or for any other purpose in accordance with the present invention.

In another embodiment, shown in FIGS. 11 and 12, a sheet of material is designated by the general reference numeral 10d. The sheet of material 10d is exactly the same as the sheet of material 10 except the sheet 10d has an extension from the upper end 16d thereof which serves as a handle 88 once the sheet of material 10d has been connectingly and crimpingly wrapped and closed about a vase 40 in the manner previously described.

Referring now to FIG. 13, another sheet of material constructed for use in accordance with the present invention is designated by the general reference numeral 10e. The sheet of material 10e is exactly the same as sheet 10 except for the differences described herein.

The sheet of material 10e has a first side 12e, a second side 14e, an upper end 16e, a lower end 18e, an inner surface 20e and an outer surface 22e. Disposed upon at least a portion of the inner surface 20e is a first closure bonding material 24e and a connecting bonding material 26e and a second closure bonding material 90. The first closure bonding material 24e extends from the first side 12e to the second side 14e, and is spaced a distance 28e from the upper side 16e. The connecting bonding material 26e extends from the first side 12e to the second side 14e and is spaced a distance 30e from the lower end 18e of the sheet 10e. The first closure bonding material 24e may be separated from the connecting bonding material 26e by a distance 32e. Each of the distances 28e and 30e may be zero, as described above for the sheet of material 10.

The second closure bonding material 90 is disposed adjacent the second side 14e and preferably extends from the upper end 16e to the lower end 18e.

As shown in FIGS. 14 and 15, the sheet of material 10e may be wrapped about the container 40 in exactly the same manner as explained previously for the embodiments shown in FIGS. 3–5. After the connecting bonding material 26e of the sheet 10e bondingly engages the sheet 10e to the container 10e, the second connecting bonding material 90 is bondingly connected to portions of the outer surface 22e of the sheet 10e for effecting a seal 92 which extends at least part way between the upper end 16e and the lower end 18e of the sheet 10e. As shown in FIG. 15, after the seal 92 is formed, the first closure bonding material 24e may be crimped together as described above to form a crimped portion 66 in the sheet 10e. Alternatively, the sealed area 92 may be formed after the crimped portion 66 has been formed.

Changes may be made in the construction and the operation of the various components, elements and assemblies described herein or in the steps or the sequence of steps of the methods described herein without departing from the spirit and scope of the invention as defined in the following claims.

What is claimed is:

1. A method of wrapping a vase having a floral grouping disposed therein, comprising:

providing a vase having an upper end, a lower end, an outer surface, and an inner surface which defines and encompasses an inner space, the inner space accessible via an opening in the upper end, wherein a portion of a floral grouping having an upper end is disposed within the inner space of the vase, the upper end of the floral grouping extending a distance from the upper end of the vase;

providing a sheet of material having a first side, a second side, an upper end, a lower end, an inner surface and an outer surface, the sheet of material further comprising a connecting bonding material disposed upon a portion of the inner surface for connecting to the outer surface of the vase and a closure bonding material also disposed upon a portion of the inner surface of the sheet of material for effecting a sealed area;

disposing the vase with the floral grouping disposed therein adjacent the inner surface of the sheet of material wherein a portion of the connecting bonding material is positioned in close proximity to a portion of the outer surface of the vase and wherein the closure bonding material is positioned a distance above the upper end portion of the floral grouping;

wrapping the sheet of material about an upper portion of the vase wherein the connecting bonding material causes the sheet of material to be connected to a portion of the upper portion of the vase and wherein the upper end of the floral grouping is completely encompassed and surrounded by the sheet of material such that the upper end of the sheet of material extends a distance above the upper end of the floral grouping; and sealing the upper end of the sheet of material by crimping together portions of the sheet of material having the closure bonding material disposed thereon forming a floral containing space within which is contained the portion of the floral grouping extending from the upper end of the vase.

2. The method of claim 1 wherein in the step of providing a sheet of material, the sheet of material has a detaching means for allowing an upper portion of the sheet of material to be detached after the sheet of material has been wrapped about the vase.

3. The method of claim 1 wherein in the step of providing a sheet of material, the sheet of material has a label disposed thereon.

4. The method of claim 1 wherein in the step of providing a sheet of material, the sheet of material has a bonding material for allowing a label, note, card or other information delivery means to be attached to the outer surface of the sheet of material after the sheet has been wrapped about the vase.

5. The method of claim 1 wherein in the step of providing a sheet of material, the sheet of material has an extension for serving as a handle after the sheet of material has been wrapped about the vase.

6. The method of claim 1 wherein in the wrapping step, the sheet of material is placed on an inclined surface, the vase with the floral grouping is placed on the sheet of material thus inclined, and the sheet of material is wrapped about the vase by rolling the vase from one end of the sheet toward the other end of the sheet whereby the connecting bonding material is connected to the vase.

7. The method of claim 1 wherein in the step of providing the sheet of material, the sheet is selected from a group consisting of a paper (untreated or treated in any manner), cellophane, foil, polymer film, fabric (woven or nonwoven or synthetic or natural), burlap, or combinations thereof.

8. The method of claim 1 wherein in the step of providing the sheet of material, the sheet has a thickness in the range of from about 0.1 mils to about 30 mils.

9. The method of claim 1 wherein in the step of providing the sheet of material, the sheet has a thickness in the range of from about 0.2 mils to about 10 mils.

10. The method of claim 1 wherein in the step of providing the sheet of material, the sheet has a thickness in the range of from about 0.5 mils to about 5 mils.

11. The method of claim 1 wherein in the step of providing the sheet of material the sheet further comprises detaching means for detaching an upper portion of the sheet of material after the sheet of material has been bondingly connected to the vase.

12. The method of claim 1 wherein in the step of providing a vase, the vase is further defined as a bud vase and wherein the floral grouping comprises one bud or flower.

13. The method of claim 1 wherein in the step of providing the sheet of material, the connecting bonding material and the closure bonding material are an adhesive or a cohesive.

14. The method of claim 1 wherein in the step of providing the sheet of material, the sheet further comprises a second closure bonding material for effecting a vertical sealed area between the upper end and lower end of the sheet of material after the wrapping step.

* * * * *

UNITED STATES PATENT AND TRADEMARK OFFICE
CERTIFICATE OF CORRECTION

PATENT NO. : 5,488,813
DATED : February 6, 1996
INVENTOR(S) : Weder

It is certified that error appears in the above-indentified patent and that said Letters Patent is hereby corrected as shown below:

Column 4, line 47, after "heat", please insert --,--.

Column 4, line 65, after "second", please insert --sheet--.

Column 5, line 19, please delete "singe", and substitute therefor --single--.

Column 6, line 50, please delete "bloom 58 portion", and substitute therefor --bloom portion 58--.

Column 7, line 61, please delete "of-material", and substitute therefor --of material--.

Column 8, line 9, please delete "lower surface 22", and substitute therefor --outer surface 22--.

Column 8, line 16, after first occurrence of "material", please delete "of material".

UNITED STATES PATENT AND TRADEMARK OFFICE
CERTIFICATE OF CORRECTION

PATENT NO. : 5,488,813
DATED : February 6, 1996
INVENTOR(S) : Weder

It is certified that error appears in the above-indentified patent and that said Letters Patent is hereby corrected as shown below:

Column 9, line 11, please delete "container 10e", and substitute therefor --container 40--.

Signed and Sealed this

Ninth Day of July, 1996

BRUCE LEHMAN

*Attest:*

*Attesting Officer*        Commissioner of Patents and Trademarks